Nov. 25, 1958  T. F. HURSEN  2,861,587
VENT VALVE DEVICE
Filed Nov. 25, 1955
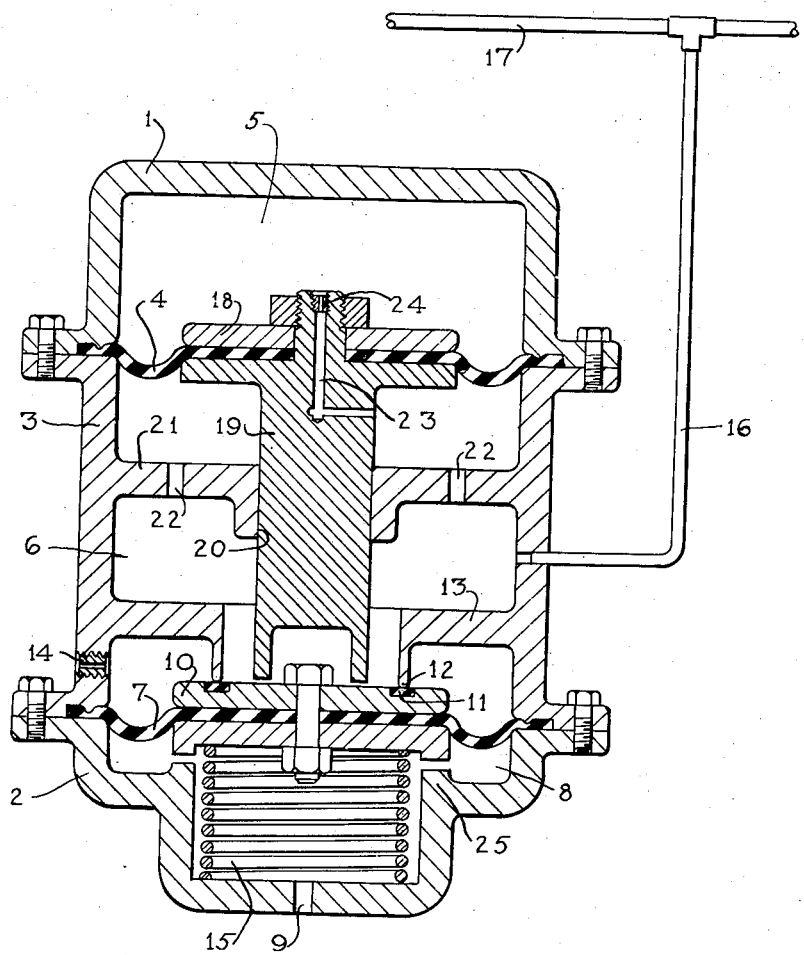
INVENTOR.
Thomas F. Hursen
BY
Adelbert A. Steinmiller
ATTORNEY

United States Patent Office 2,861,587
Patented Nov. 25, 1958

2,861,587

VENT VALVE DEVICE

Thomas F. Hursen, McKeesport, Pa., assignor to Westinghouse Air Brake Company, Wilmerding, Pa., a corporation of Pennsylvania Application November 25, 1955, Serial No. 548,871

4 Claims. (Cl. 137—494)

This invention relates to vent valve devices of the type for controlling reduction of fluid pressure in a chamber, conduit or passageway to a predetermined low value.

Vent valve devices of the above-described type are used extensively, for example, in one form or another, in fluid pressure operated railway vehicle brake systems in a well-known manner for venting the brake pipe on the individual cars that make up the train. Usually the vent valve device is incorporated with the brake valve and responds to an emergency brake application rate of pressure reduction in the brake pipe to discharge brake pipe pressure in the individual cars after the action has been initiated by the engineer's control valve. This discharge to atmosphere usually results in a reduction of brake pipe pressure to atmospheric value.

Depending upon the type of brake control valve device employed, however, it is not always necessary to reduce brake pipe pressure to atmosphere, and to do so merely necessitates a longer waiting period for recharging the brake pipe after an emergency application of the brakes.

Accordingly, the principal object of the invention is to provide an improved, inexpensive and simply constructed self-closing vent valve device by which the reduction of brake pipe pressure may be definitely controlled to limit such reduction to a desired predetermined low value.

As represented in the drawing, the vent valve device embodying the invention may comprise a sectionalized casing of two end sections 1, 2, and an intermediate section 3. A movable abutment, or diaphragm 4, peripherally clamped between the casing sections 1 and 3, separates a pressure chamber 5, defined by the casing section 1 and said diaphragm, from a control chamber 6 defined by said diaphragm, the intermediate casing section 3 and another movable abutment, or diaphragm 7, peripherally clamped between casing sections 2 and 3. The diaphragm 7 and casing section 2 cooperate to define an atmospheric chamber 8, on the side of said diaphragm opposite chamber 6, constantly open to atmosphere by way of a vent 9.

A diaphragm follower 10, carried by the diaphragm 7, is provided, on the side adjacent chamber 6, with a valve 11 which is normally adapted to occupy a seated position, in which it is shown in the drawing, against a seat rib 12 formed on a supporting wall 13 extending radially and internally of the casing section 3. When the valve 11 is in its seated position, it serves to seal off chamber 6 from an annular chamber formed between the wall 13 and diaphragm 7, which chamber is open to atmosphere through a port in the wall of casing section 3 having a choke fitting 14 therein of selected orifice size to enable fluid under pressure to be rapidly released to atmosphere. A spring 15 of predetermined value, disposed in chamber 8 of casing section 2, biases the diaphragm follower 10, and consequently the valve 11, against the seat rib 12.

Chamber 6 is constantly open to a conduit 16, which, for the purpose of illustrating the invention, is shown as connected to a brake pipe 17 of a railway vehicle. It should be understood, however, that conduit 16 may lead to any other conduit, passageway or chamber in which the reduction of fluid pressure is desired to be controlled.

The diaphragm 4 is also provided with a follower 18 having coaxially aligned therewith a follower stem 19 which extends through chamber 6 and has sliding fit in a bore 20 of a supporting wall 21 formed in said chamber and extending radially from the casing section 3. The wall 21 has a plurality of large openings 22 to permit free communication between the two sides of the wall. The free end of stem 19 is arranged to engage the follower 10 of the diaphragm 7, within the seat rib 12, for a purpose to be hereinafter described. Chambers 5 and 6 are in constant communication through a passageway 23 formed in the stem 19 and provided, as at its opening into chamber 5, with a choke fitting 24 having a restricted orifice.

In operation, assuming that an emergency brake application and, therefore, an emergency rate of pressure reduction in brake pipe 17 have been effected, in well-known manner by brake valve means (not shown), fluid pressure in chamber 6 will correspondingly be reduced. Choke fitting 24 in passageway 23, by restricting flow of fluid under pressure in chamber 5 to chamber 6, will delay equalization of fluid pressure between said chambers sufficiently to cause the higher pressure in chamber 5 acting on diaphragm 4 to overcome the opposing force of spring 15, acting through stem 19, and move said diaphragm downwardly, out of a normal position in which it is shown in the drawing, along with the stem 19 to move diaphragm 7 downwardly, out of a normal position in which it is shown in the drawing, and thereby unseat valve 11. Upon initial unseating of valve 11 by stem 19, fluid pressure in chamber 6 which, prior to the unseating of valve 11, was effective only on that portion of pressure area of diaphragm 7 encircled by seat rib 12, will be effective over the entire pressure area of the diaphragm 7 for maintaining said diaphragm 7 in what may be called a holding position determined by engagement of follower 10 with an annular shoulder 25 formed internally of casing section 2, in which position valve 11 is held unseated, or in a vent position, in which chamber 6, conduit 16 and brake pipe 17 will continue to vent past valve seat 12 by way of choke fitting 14 until said valve is reseated.

The orifice in choke fitting 14 is of such capacity as to restrict venting of brake pipe 17, conduit 16 and chamber 6 so that fluid pressure on diaphragm 7 will be sufficiently maintained during such venting to keep valve 11 unseated until fluid pressure in said brake pipe is reduced to the desired predetermined low value. Reduction of fluid pressure in chambers 5 and 6, conduit 16 and brake pipe 17 will continue until the predetermined low pressure value in said brake pipe, as determined by the value of spring 15, has been attained, at which point said spring will be effective to move diaphragm 7 and valve 11 to their normal position in which said valve is seated on valve seat 12 to cut off further pressure reduction in the brake pipe. When fluid pressure is subsequently built up in brake pipe 17, and consequently conduit 16 and chamber 6, under the control of the brake valve (not shown), the pressure in chamber 5 will again equalize with the increased pressure in chamber 6 by way of passageway 23 and choke fitting 24.

It should be evident from the above description, read in connection with the accompanying drawing, that the invention disclosed herein provides a self-closing vent valve device whereby reduction of fluid pressure in a container or conduit may be precisely controlled and limited at a desired predetermined value.

Having now described the invention, what I claim as new and desire to secure by Letters Patent, is:

1. A vent valve device comprising, in combination, a casing having a control chamber connectable to a conduit, in which pressure of fluid may be externally controlled, and a pressure chamber connected to said control chamber by a restricted passageway whereby a reduction of fluid pressure in said control chamber at or above a certain rate, commensurate with said restricted passageway, will create a differential of pressure between said chambers, a first abutment movable out of a normal position to a different position in response to occurrence of fluid pressure differential between said chambers, a second fluid pressure responsive abutment having a normal position in which a portion of its pressure area is exposed to fluid pressure in said control chamber and operable by movement of said first abutment to its said different position, to a holding position in which the entire pressure area is exposed to fluid pressure in said control chamber, valve means carried by said second abutment having a normal position in which said control chamber is closed to atmosphere when said second abutment is in its normal position, and operable to a vent position in which said control chamber is open to atmosphere by way of a constricted port in said casing when said second abutment is in its holding position, said constricted port being effective for so restricting venting of fluid pressure from said control chamber as to cause fluid pressure to be effective on said second abutment for maintaining said second abutment in its holding position in which said valve means in its said vent position until fluid pressure in said control chamber has reduced to a predetermined low value, and biasing means for returning said second abutment to its normal position upon attainment of said predetermined low value of fluid pressure in said control chamber.

2. A vent valve device comprising, in combination, a casing of two end sections and one intermediate section, a first diaphragm member clamped between one of said end casing sections and one extremity of said intermediate casing section to cooperate with said one end casing section to define an atmospheric chamber and partly with said intermediate casing section to define a control chamber, the latter chamber being connectable to a conduit in which pressure of fluid may be externally controlled, said diaphragm member having a normal position, in which said control chamber is closed to atmosphere, and operable to a holding position, in which said control chamber is open to atmosphere, a follower member carried by said first diaphragm member and movable therewith, an annular valve member carried by said follower member on the side adjacent said control chamber, an annular seat rib formed in said control chamber and on which said valve member is adapted to seat for closing said control chamber to atmosphere when said first diaphragm member is in its normal position and from which said valve member is adapted to unseat for opening said control chamber to atmosphere when said first diaphragm member is in its holding position, said seat rib cooperating with said follower member to expose only that portion of pressure area of said first diaphragm member surrounded by said seat rib to the pressure of fluid in said control chamber when said valve member is seated thereon, a second diaphragm member clamped between the other of said end casing sections and the other extremity of said intermediate casing section to cooperate with said first diaphragm member and said intermediate casing section to define said control chamber and with said other end casing section to define a pressure chamber, a follower and follower stem associated with said second diaphragm member, said follower stem having formed therein a restricted passageway connecting said pressure chamber to said control chamber whereby fluid pressure therebetween may be equalized but so restricted as to effect a higher differential of pressure in said pressure chamber, upon reduction of fluid pressure in said control chamber at or above a certain rate, whereby said second diaphragm member and said follower stem, which extends through said control chamber and is adapted to engage said follower member of said first diaphragm member, are caused to be moved from said normal position, in which said valve member is seated on said seat rib, to said holding position in which said valve member is unseated for venting said control chamber to atmosphere by way of a constricted port in said casing, the constriction of said port being effective for restricting venting of fluid pressure from said control chamber as to cause such fluid pressure to be effective over the entire pressure area of said first diaphragm member for maintaining said first diaphragm member in its holding position until fluid pressure in said control chamber has reduced to a predetermined low value, and biasing means for returning said first diaphragm member to its normal position upon reduction of fluid pressure in said control chamber to said predetermined low value.

3. A vent valve device comprising, in combination, a casing having a control chamber connectable to a conduit, in which pressure of fluid may be externally controlled, and a pressure chamber connected to said control chamber through a restricted passageway, a fluid pressure responsive movable abutment separating said control chamber from said pressure chamber, an apertured valve seat partition separating said control chamber into an upstream portion having an inlet and a downstream portion having a restricted opening to atmosphere, valve means normally occupying one position with respect to said seat aperture, in which position said valve means is subject over one area to the pressure in said upstream portion of the control chamber and closes off said upstream portion from atmosphere, and operable by said movable abutment, upon a preponderance of fluid pressure in said pressure chamber over that in said control chamber due to a reduction of fluid pressure in said control chamber at a certain rate to a vent position with respect to said seat aperture, in which position said valve means is subject over an area larger than said one area to the pressure in said downstream portion of the control chamber and in which position said control chamber is open to atmosphere by way of said restricted opening for venting said control chamber, and biasing means for returning said valve means to its said one position upon reduction of fluid pressure in said control chamber to a predetermined low value.

4. The combination defined in claim 3 wherein the valve means is characterized by a second fluid pressure responsive movable abutment operable within the casing adjacent the downstream portion of the control chamber, a valve carried by and forming a part of said second movable abutment, and an annular seat rib formed about said seat aperture, the pressure of fluid in said upstream portion of the control chamber being effective over the area within said seat rib, when said valve is seated on said seat rib, and over the entire pressure area of said second abutment when said valve is unseated from said seat rib by the first said movable abutment, for maintaining said valve unseated from said seat rib against the opposing force of the biasing means until the pressure of fluid in the control chamber has attained the predetermined low value.

References Cited in the file of this patent

UNITED STATES PATENTS

| | | |
|---|---|---|
| 449,222 | Kimball | Mar. 31, 1891 |
| 1,437,861 | Porter | Dec. 5, 1922 |
| 1,956,691 | McCune | May 1, 1934 |
| 2,024,653 | McCune | Dec. 17, 1935 |
| 2,369,994 | Whitney | Feb. 20, 1945 |